United States Patent
He et al.

(10) Patent No.: US 9,252,677 B2
(45) Date of Patent: Feb. 2, 2016

(54) QUASI RESONANT PUSH-PULL CONVERTER AND CONTROL METHOD THEREOF

(75) Inventors: Zhifeng He, Guangdong (CN); Yucheng Yang, Guangdong (CN)

(73) Assignee: LIAN ZHENG ELECTRONICS (SHENZHEN) CO., LTD. (CN)

( * ) Notice: Subject to any disclaimer, the term of this patent is extended or adjusted under 35 U.S.C. 154(b) by 220 days.

(21) Appl. No.: 13/982,207

(22) PCT Filed: Jan. 21, 2012

(86) PCT No.: PCT/CN2012/070699
§ 371 (c)(1),
(2), (4) Date: Oct. 9, 2013

(87) PCT Pub. No.: WO2012/100740
PCT Pub. Date: Aug. 2, 2012

(65) Prior Publication Data
US 2014/0022826 A1    Jan. 23, 2014

(30) Foreign Application Priority Data
Jan. 28, 2011 (CN) .......................... 2011 1 0030967

(51) Int. Cl.
*H02M 3/335* (2006.01)
*H02M 3/337* (2006.01)
*H02M 1/00* (2007.01)

(52) U.S. Cl.
CPC .......... *H02M 3/3376* (2013.01); *H02M 3/3372* (2013.01); *H02M 2001/0058* (2013.01); *Y02B 70/1433* (2013.01); *Y02B 70/1491* (2013.01)

(58) Field of Classification Search
CPC .......... H02M 2001/007; H02M 3/335; H02M 3/3374; H02M 3/337
USPC .......................... 363/16–20, 21.04, 21.06, 25
See application file for complete search history.

(56) References Cited

U.S. PATENT DOCUMENTS 6,011,704 A * 1/2000 Coleman ................. H02M 3/28
323/258
6,320,764 B1 * 11/2001 Jiang ................. H02M 3/33523
323/255

(Continued)

FOREIGN PATENT DOCUMENTS

| CN | 1352482 A | 6/2002 |
| CN | 101588135 A | 11/2009 |
| CN | 101588139 A | 11/2009 |

OTHER PUBLICATIONS

International Preliminary Report on Patentability Corresponding to International Application No. PCT/CN2012/070699; Date of Issuance: Jul. 30, 2013; 8 Pages.

(Continued)

*Primary Examiner* — Rajnikant Patel
(74) *Attorney, Agent, or Firm* — Myers Bigel Sibley & Sajovec, P.A.

(57) ABSTRACT

The invention relates to a quasi-resonant push-pull converter and the method for controlling the same, said push-pull converter comprising: a direct current (DC) input power supply configured to supply DC input for the converter; a first power input unit and a second power input unit, connected to said DC input power supply, respectively and configured to supply input for the converter in different periods, comprising a first power switching tube and a second power switching tube, a first primary winding and a second primary winding; a power output circuit, configured to supply output of the converter, comprising secondary windings and full-bridge rectification circuits; a first output capacitor and a second output capacitor connected to said power output circuit and configured to store DC electric energy output by the power output circuit in which a resonant element is arranged to achieve a quasi-resonant switching circuit through voltage feedback; and a switching circuit being controlled through voltage feedback, whereby turns ratio of the primary windings and the secondary windings of the push-pull converter is controlled.

11 Claims, 5 Drawing Sheets

(56) References Cited

U.S. PATENT DOCUMENTS

| | | | |
|---|---|---|---|
| 7,542,316 B2 * | 6/2009 | Nakahori | H01F 38/00 363/125 |
| 7,564,702 B2 * | 7/2009 | Schlecht | 363/21.06 |
| 8,102,678 B2 * | 1/2012 | Jungreis | 363/21.03 |

OTHER PUBLICATIONS

International Search Report and Written Opinion Corresponding to International Application No. PCT/CN2012/070699; Date of Mailing: Apr. 19, 2012; Foreign Text, 6 Pages, English Translation Thereof, 7 Pages.

* cited by examiner

QUASI RESONANT PUSH-PULL CONVERTER AND CONTROL METHOD THEREOF

FIELD OF THE INVENTION

This invention relates to the field of power electronics technology, and more particularly, relates to a quasi-resonant push-pull converter and the method for controlling the same.

BACKGROUND OF THE INVENTION

Currently, the development in power electronics technology requires electronic products to be smaller and lighter, and makes a higher requirement on efficiency and electromagnetic compatibility. In a power electronics device, a filter inductor, a capacitor and a transformer account for a large proportion, so taking measures to reduce the size and weight of those components is a major means for the concept of being smaller and lighter. Improving switching frequency can accordingly improve cut-off frequency of a filter, and thus comparatively smaller inductors and capacitors can be chosen to reduce the size and weight of a filter. Improving switching frequency can reduce the size and weight of a transformer similarly.

However, while switching frequency is improved, switching losses will be increased and the problems of inductive turn-off, capacitive turn-on and diodes reverse recovery will be aggravated, which will give rise to reduction of circuit efficiency and increase of electromagnetic interference. In response to these problems, soft switching technology appears and it can solve the problem of switching losses in a converter, and meanwhile, solve the problem of EMI (Electro Magnetic Interference) caused by hard switching. Soft switching technology usually refers to ZVS (Zero Voltage Switch) and ZCS (Zero Current Switch), or similar ZVS and ZCS.

Soft switching converter of a DC-DC converter comprises: a plurality of soft switching technologies, such as, Resonant Converter, Quasi Resonant Converter, Multiple Resonant Converter, Zero Switching PWM Converter and Zero Transition PWM Converter and the like.

A Resonant Converter, actually a DC switch power supply loading a resonant converter, is obtained by the method of simply adding resonant elements to a standard PWM Converter. Resonant converts can be categorized into series resonant converter and parallel resonant converter in terms of resonant modes of resonant elements, and can be categorized into series load resonant converter and parallel load resonant converter in terms of the connecting relations between loads and resonant circuits. The working principle of the load resonant converters is that the current or voltage flowing through a switching element is reformed into a sinusoidal waveform through the resonance of resonant elements with loads; the switching elements are closed or opened at the zero-crossing of current or voltage; and a process of soft switching is achieved.

A Quasi Resonant Converter is so called because the time for its circuit working under resonance only is part of a switching period. A quasi resonant converter enables the current or voltage in a switching element to vary quasi-sinusoidally through resonance, thus to create a switching condition of zero current or zero voltage, which greatly reduces switching losses and switching noises of the converter.

A Multiple Resonant Converter is so called because there are not only one resonant topology and parameters in the circuit and it can achieve a switching tube's switching under zero voltage but only by the method of frequency controlling. A multiple resonant converter of zero voltage is usually used in practices mainly because it absorbs junction capacitor of a switching tube and a rectifier diode and achieves zero voltage switching of a switching tube and a rectifier diode.

A Zero Switching PWM Converter includes zero voltage PWM converter and zero current PWM converter which achieve PWM control by adding an auxiliary switching tube on the basis of a quasi resonant soft switch to control resonant process of resonant elements. Because only resonance is used for phase commutation and PWM working mode is still used after the phase commutation, the defect of hard switch PWM in the switching process is overcome and the advantage of low-steady-state losses and low-steady-state stress of hard switch PWM converter.

A Zero Transition PWM Converter includes ZVS-PWM converter and ZCS-PWM converter. Such a converter, combining a quasi resonant converter with a conventional PWM converter, interrupts a resonant process by an additional auxiliary active switch, causing a circuit to operate in ZCS or ZVS quasi-resonant mode in part of the time within a week and operate in PWM mode in the remaining part of the time within a week. It has both the characteristics of a soft switch and characteristics of PWM constant frequency duty ratio adjustment.

In ZVS-PWM converter and ZCS-PWM converter, a resonant inductor is cascaded in a main power return circuit, so there is a lot circulating energy in the circuit, which inevitably increases closing losses of a circuit. In addition, inductive energy storage is much related to input voltage and output load, which makes the soft switching condition of the circuit largely depend on the changes of the input power supply and output load.

The wide application of soft switching technology brings about revolutionary changes to the design of power electronics converter. The application enables the power electronics converter to have a higher efficiency—dramatic reduction of its own losses, to have a higher power density—dramatic decrease of its own size and weight, and to have a higher reliability. The application can also efficiently reduce the magnetic and environmental pollution caused by electric energy conversing devices and provide an efficient way and method for greatly developing green power electronics products.

SUMMARY OF THE INVENTION

To solve the problem above, the invention provides a method for controlling a quasi-resonant push-pull converter, applied to a push-pull converter having a resonant capacitor, said push-pull converter comprising: a direct current (DC) input power supply configured to supply DC input for the converter; a first power input unit and a second power input unit, connected to said DC input power supply, respectively and configured to supply input for the converter in different periods, comprising a first power switching tube and a second power switching tube, a first primary winding and a second primary winding; a power output circuit, configured to supply output of the converter, comprising secondary windings and full-bridge rectification circuits; a first output capacitor and a second output capacitor connected to said power output circuit and configured to store DC electric energy output by the power output circuit, characterized in:
arranging a resonant element in the power output circuit to achieve a quasi-resonant switching circuit through voltage feedback; and controlling a switching circuit through voltage feedback, whereby turns ratio of the primary windings and the secondary windings of the push-pull converter is controlled.

Preferentially, said arranging a resonant element in the power output circuit specifically is: arranging a transformer leakage inductor, a resonant capacitor, and a first inductor and a second inductor in the power output circuit.

Preferentially, the method further comprises: arranging a first full-bridge rectification circuit, a second full-bridge rectification circuit and switching elements in the power output circuit; controlling working turns of the secondary windings by control of closure or open of the switching elements; changing turns ratio of the primary windings and the secondary windings so that work of the resonant circuit will not vary with high or low input voltages; and making both of the first power switching tube and the second power switching tube of the primary side work in a switching mode under a resonant mode.

Preferentially, said controlling a switching circuit through voltage feedback specifically is: predetermining a certain voltage value and setting the switching circuit to be opened when the DC input voltage is detected to be higher than the predetermined value; and setting the switching circuit to be closed when the DC input voltage is detected to be lower than the predetermined value, whereby working turns of the secondary winding are controlled.

The invention also provides a quasi-resonant push-pull converter, comprising: a direct current (DC) input power supply configured to supply DC input for the converter; a first power input unit and a second power input unit, connected to said DC input power supply, respectively and configured to supply input for the converter in different periods, comprising a first power switching tube and a second power switching tube, a first primary winding and a second primary winding; a power output circuit, configured to supply output of the converter, comprising secondary windings and full-bridge rectification circuits; a first output capacitor and a second output capacitor connected to said power output circuit and configured to store DC electric energy output by the power output circuit, characterized in:

the power output circuit further comprising a transformer leakage inductor, a resonant capacitor, and inductors to achieve a quasi-resonant switching circuit through voltage feedback; and controlling a switching circuit through voltage feedback, whereby turns ratio of the primary windings and the secondary windings of the push-pull converter is controlled.

Preferentially, the method further comprises: arranging a first full-bridge rectification circuit, a second full-bridge rectification circuit and switching elements in the power output circuit; controlling working turns of the secondary windings by control of closure or open of the switching elements to change turns ratio of the primary windings and the secondary windings so that work of the resonant circuit will not vary with high or low input voltages; and making both of the first power switching tube and the second power switching tube of the primary side work in a switching mode under a resonant mode.

Preferentially, said switching elements comprise a first switch and a second switch; said first switch and second switch are connected between said first full-bridge rectification circuit and second full-bridge rectification circuit.

Preferentially, resonant frequency is set to be twice as high as switching frequency.

Preferentially, said secondary windings comprise a first secondary winding, a second secondary winding, a third secondary winding and a fourth secondary winding; the first secondary winding cascades the second secondary winding and the third secondary winding cascades the fourth secondary winding to supply output when the first switch and the second switch are both closed; the second secondary winding and the third secondary winding supply output when the first switch and the second switch are both opened.

Preferentially, the method further comprises: predetermining a certain voltage value and setting both of the first switch and the second switch to be opened when the DC input voltage is higher than the predetermined value; and setting both of the first switch and the second switch to be closed when the DC input voltage is lower than the predetermined value.

DETAILED DESCRIPTION OF THE ILLUSTRATIVE EMBODIMENTS

Figure 1:
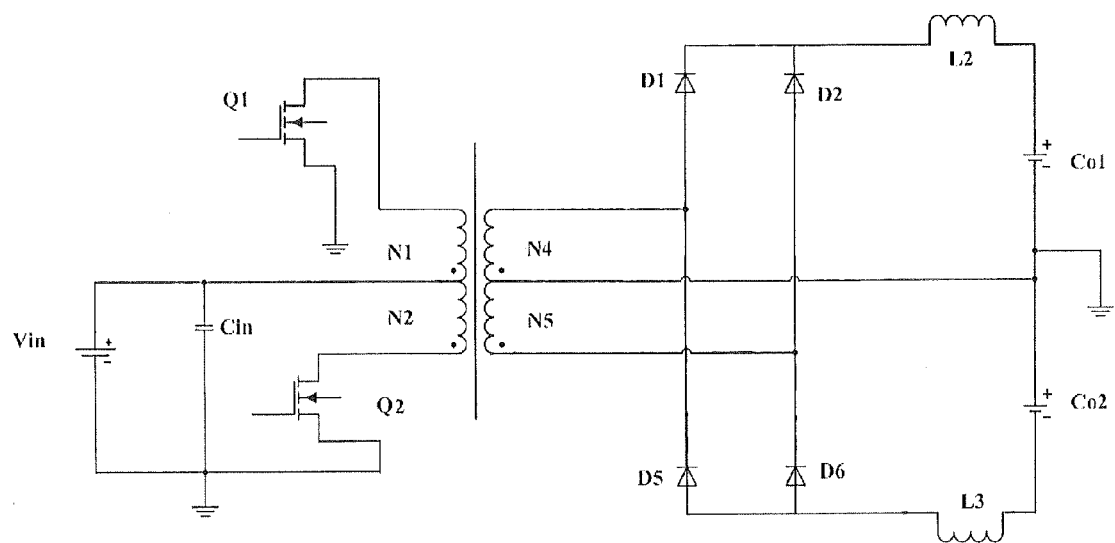
FIG. 1 shows a structural diagram for illustrating a push-pull converter in accordance with the prior art.

The exemplary embodiments are introduced now by referring to drawings of the invention. However, the invention can be embodied in many different ways and is not limited to the embodiments described here. Providing those embodiments is to completely disclose the invention in detail and fully express the scope of the invention to those skilled in the art. The terminologies used in the exemplary embodiments of the drawings are not definitions to the invention. In the drawings, identical reference sign is used for identical unit/element.

Unless otherwise stated, the "one", "a", "said" and "the" also refer to plural forms. Furthermore, it should be understood that the terminologies "comprise", "include" and/or "contain" in the description designate some features, objects, procedures, operations, units and/or elements, but not exclude one or more features, objects, procedures, operations, units and/or elements and/or groups composed of them. It should be known that when a unit is termed to be "connected" or "coupled" to another unit, it can be directly connected with or coupled to another unit and a middle unit might also exist. Additionally, the "connection" or "couple" referred here includes wireless connection or couple. The terminology "and/or" here includes one, or any combination and all the combinations of the aforesaid items.

Unless otherwise stated, the terminologies (including technical terminologies) used here have common meanings to those skilled in the art. It is understandable that the common terminologies used in a dictionary should be considered to have meanings in conformity with the contexts of relevant fields, rather than be considered as idealistic meanings or excessively formal meanings.

A push-pull converter has a simple structure and conveys energy by the alternative closure of two switching tubes. The transformer in the push-pull converter is a bidirectional excited one. The push-pull converter can transmit a large power and has a high utilization ratio. There is closing voltage drop of only one switching tube in the input return circuit at work, so comparatively small closing losses are produced, therefore, it is especially applicable to power supply system with low input voltage. However, the push-pull converter has the problem of magnetic bias, so the circuit must have a good symmetry, otherwise, DC magnetic bias might be caused, resulting in saturation of magnetic core. Theoretically, a switching tube can bear twice the amount of input voltage, but due to the existence of leakage inductance, the voltage peak is bigger than that when the switching tube is turned off, so this requires the transformer windings to be closely coupled to reduce leakage inductance, and also raises a new requirement for the switching tube to withstand voltage.

FIG. 1 shows a structural drawing for illustrating a push-pull converter in accordance with the prior art. The primary side of a push-pull converter comprises a DC input power supply, MOSFET switching tubes Q1 and Q2, an input capacitor Cin and the primary windings of turns N1 and N2 whose connecting relations are: the positive electrode of the DC input power supply connects with the source electrode of the MOSFET switching tube Q1 via the primary windings of turns N1 and the drain electrode of the MOSFET switching tube Q1 is grounded; the positive electrode of the DC input power supply connects with the source electrode of the MOSFET switching tube Q2 via the primary windings of turns N2 and the drain electrode of the MOSFET switching tube Q2 is grounded; and the input capacitor Cin is paralleled to the DC input power supply, with one end connected to the dotted terminal of the primary windings of turns N1 and the other end connected to ground wires.

The secondary side of a push-pull converter comprises: a secondary windings with turns N4, a secondary windings with turns N5, a full-bridge rectifier, inductors L2 and L3, output capacitors Co1 and Co2, wherein the full-bridge rectifier comprises diodes D1, D2, D5 and D6, whose connecting relations are: both of the dotted terminal of the secondary windings with turns N4 and the other end of the secondary windings with turns N5 are grounded; the other end of the secondary windings with turns N4 connects with the positive electrode of the diode D1 and the negative electrode of the diode D5; the dotted terminal of the secondary windings with turns N5 connects with the positive electrode of the diode D2 and the negative electrode of the diode D6. The negative electrode of the diode D1 is connected to the negative electrode of the diode D2 and one end of the inductor L2; the other end of the inductor L2 connects with the positive electrode of the output capacitor Co1; the negative electrode of the output capacitor Co1 is grounded; the positive electrode of the diode D5 is connected to the positive electrode of the diode D6 and one end of the inductor L3; the other end of the inductor L3 connects with the negative electrode of the output capacitor Co2; the positive electrode of the output capacitor Co2 is grounded.

The circuit operations of FIG. 1 specifically is: in the first period, MOSFET switching tube Q1 is closed and currents flow along the primary windings with turns N1 to MOSFET switching tube Q1. Accordingly, in the secondary side, currents flow from the other end of the secondary windings with turns N4 to its dotted terminal via the output capacitor Co2, the inductor L3 and the diode D5; meanwhile, currents flow from the other end of the secondary windings with turns N5 to its dotted terminal, and to the output capacitor Co1 via the diode D2 and the inductor L2.

In the second period, MOSFET switching tube Q2 is closed and currents flow along the primary windings with turns N2 to MOSFET switching tube Q2. Accordingly, in the secondary side, currents flow from the dotted terminal of the secondary windings with turns N5 to its other end via the output capacitor Co2, the inductor L3 and the diode D6; meanwhile, currents flow from the dotted terminal of the secondary windings with turns N4 to its other end, and to the output capacitor Co1 via the diode D1 and the inductor L2.

A push-pull converter is easy to control and has a low cost. However, when the input power is high, it cannot provide a high transmitting efficiency. Switching losses of power switching tubes Q1 and Q2 become more serious, in particular, at the time of a higher frequency and a high power density. To solve the problem above, the invention puts forward a quasi-resonant push-pull converter to reduce switching losses of the switching tubes and provide a economical push-pull converter with high power density, high efficiency and high-power.

Figure 2:
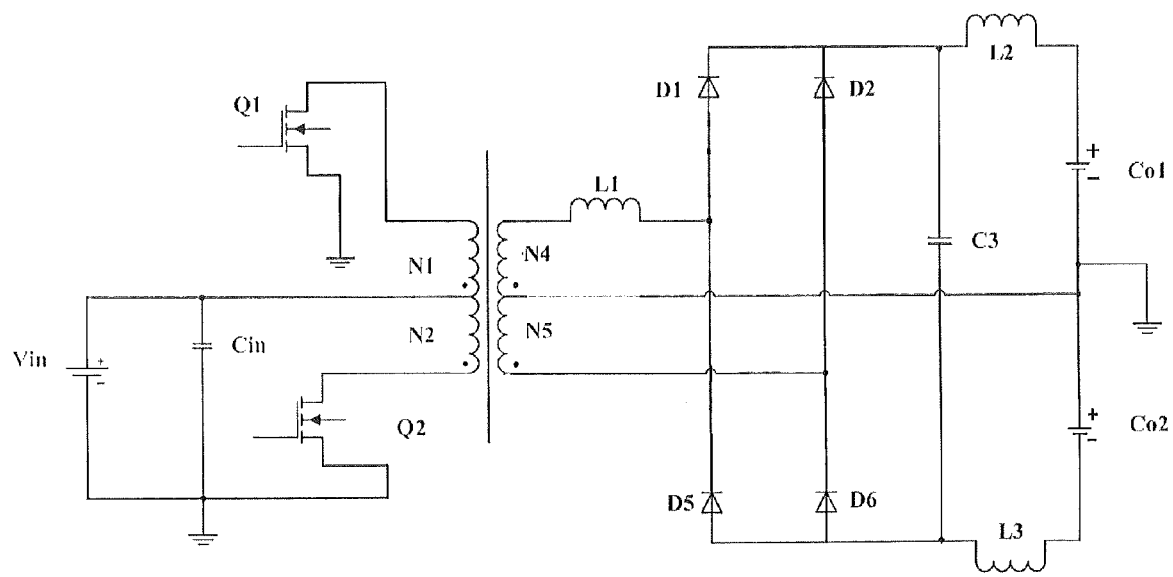
FIG. 2 shows a structural diagram for illustrating a quasi-resonant push-pull converter in accordance with the prior art.

FIG. 2 shows a structural drawing for illustrating a quasi-resonant push-pull converter in accordance with the prior art. The primary side of a push-pull converter comprises a DC input power supply, MOSFET switching tubes Q1 and Q2, an input capacitor Cin and the primary windings of turns N1 and N2 whose connecting relations are: the positive electrode of the DC input power supply connects with the source electrode of the MOSFET switching tube Q1 via the primary windings of turns N1 and the drain electrode of the MOSFET switching tube Q1 is grounded; the positive electrode of the DC input power supply connects with the source electrode of the MOSFET switching tube Q2 via the primary windings of turns N2 and the drain electrode of the MOSFET switching tube Q2 is grounded; and the input capacitor Cin is paralleled to the DC input power supply, with one end connected to the dotted terminal of the primary windings of turns N1 and the other end connected to ground wires.

The secondary side of a push-pull converter comprises: a secondary windings with turns N4, a secondary windings with turns N5, a transformer equivalent leakage inductor L1, a full-bridge rectifier, a resonant capacitor C3, inductors L2 and L3, output capacitors Co1 and Co2, wherein the full-bridge rectifier comprises diodes D1, D2, D5 and D6, whose connecting relations are: both of the dotted terminal of the secondary windings with turns N4 and the other end of the secondary windings with turns N5 are grounded; the other end of the secondary windings with turns N4 connects with one end of the transformer equivalent leakage inductor L1; the other end of the transformer equivalent leakage inductor L1 connects with the positive electrode of the diode D2 and the negative electrode of the diode D5; the dotted terminal of the secondary windings with turns N5 connects with the positive electrode of the diode D2 and the negative electrode of the diode D6. The negative electrode of the diode D1 is connected to the negative electrode of the diode D2, the resonant capacitor C3 and one end of the inductor L2; the other end of the inductor L2 connects with the positive electrode of the output capacitor Co1; the negative electrode of the output capacitor Co1 is grounded; the positive electrode of the diode D5 is connected to the positive electrode of the diode D6, the other end of the resonant capacitor C3 and one end of the inductor L3; the other end of the inductor L3 connects with the negative electrode of the output capacitor Co2; the positive electrode of the output capacitor Co2 is grounded.

Figure 3:
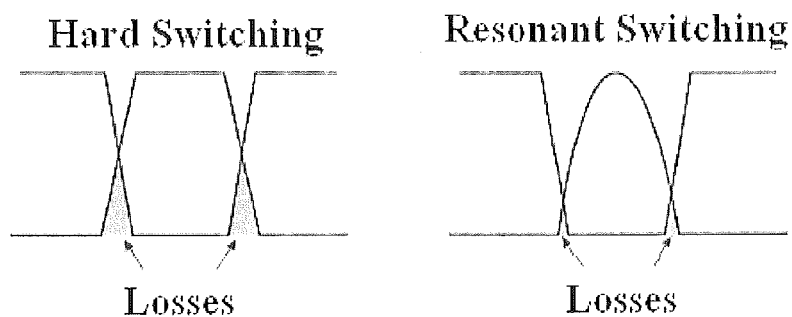
FIG. 3 illustrates the losses of Q1 and Q2 in the hard switching mode and the resonant mode.

FIG. 3 illustrates the losses of Q1 and Q2 in the hard switching mode and the resonant mode. It is apparent that the losses of MOSFET switching tubes Q1 and Q2 in the hard switching mode are greater than those in the resonant mode.

However, when the input DC power supply is a battery, as the battery discharging attributes maintain for a long time under low voltages, the design of a resonant circuit usually matches requirements for low voltage input in order to maintain the overall discharging efficiency, so the resonant circuit cannot meet the requirements for high voltage input of the battery and low voltage input after discharging for some time, and cannot maintain the best resonant effect. Therefore, when the input voltage of the battery is comparatively high, duty becomes smaller and resonance is ineffective; when Q1 and Q2 switches enter hard switching mode, a lot of switching and closing losses shall be produced.

Figure 4:
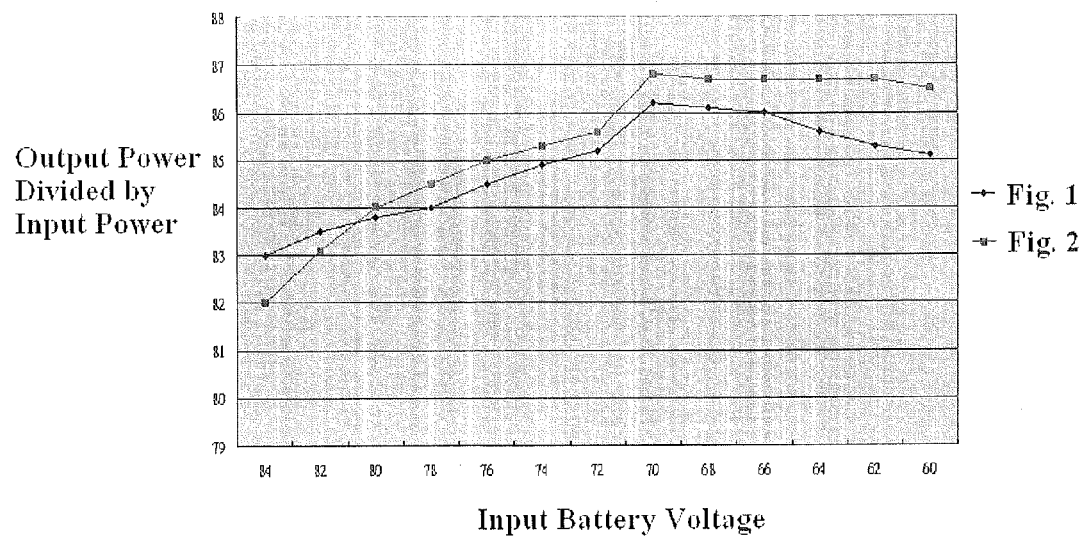
FIG. 4 shows a comparison graph for illustrating power transient efficiency of FIG. 1 and FIG. 2 under different input voltages.

FIG. 4 shows a comparison graph for illustrating power transient efficiency of FIG. 1 and FIG. 2 under different input voltages. The X-axis in FIG. 4 represents the input battery voltage progressively increasing from the left to the right, and the lowest voltage is 60 volts and the highest one is 84 volts, wherein the voltage progressively increases by 2 volts with each coordinate. The Y-axis represents the value of output power divided by input power and the value is expressed in percentage, and the lowest value is 79% and the highest one is 88%, wherein each coordinates progressively increases by 1%. The rectangle point represents the power transient efficiency value of the circuit as shown by FIG. 2 under different voltages, and the rhombohedral point represents the power transient efficiency value of the circuit as shown by FIG. 1 under different voltages.

As shown by FIG. 4, when the input battery voltage is between 84 volts and 70 volts, the values of output power divided by input power of the circuits as shown by FIG. 1 and FIG. 2 go up as the input battery voltage goes down; when the input battery voltage is between 70 volts and 60 volts, the value of output power divided by input power of the circuit as shown by FIG. 1 goes down as the input battery voltage goes down; when the input battery voltage is 68 volts, 66 volts, 64 volts and 62 volts, the values of output power divided by input power of the circuit as shown by FIG. 2 are identical, all the values being smaller than the value of output power divided by input power when the input battery voltage is 70 volts and greater than the value of output power divided by input power when the input battery voltage is 60 volts.

The values of output power divided by input power of the two maximize when the input battery voltage is 70 volts and the values of output power divided by input power of the two minimize when the input battery voltage is 84 volts. When the input battery voltage is 84 volts and 82 volts, the value of output power divided by input power of the circuit as shown by FIG. 1 is greater than that as shown by FIG. 2, whereas at all the other points, the values of output power divided by input power of the circuit as shown by FIG. 1 are smaller than that as shown by FIG. 2.

Therefore, in most cases, the efficiency of the quasi-resonant push-pull converter as shown by FIG. 1 is higher than that of the push-pull converter as shown by FIG. 2, but when the battery inputs high voltages, such as, the interval between 70 volts and 84 volts, the efficiency of the quasi-resonant push-pull converter is still not high. Thus, a converter is needed to still provide high efficiency when there is a wide range of voltages of the input DC power supply.

Figure 5:
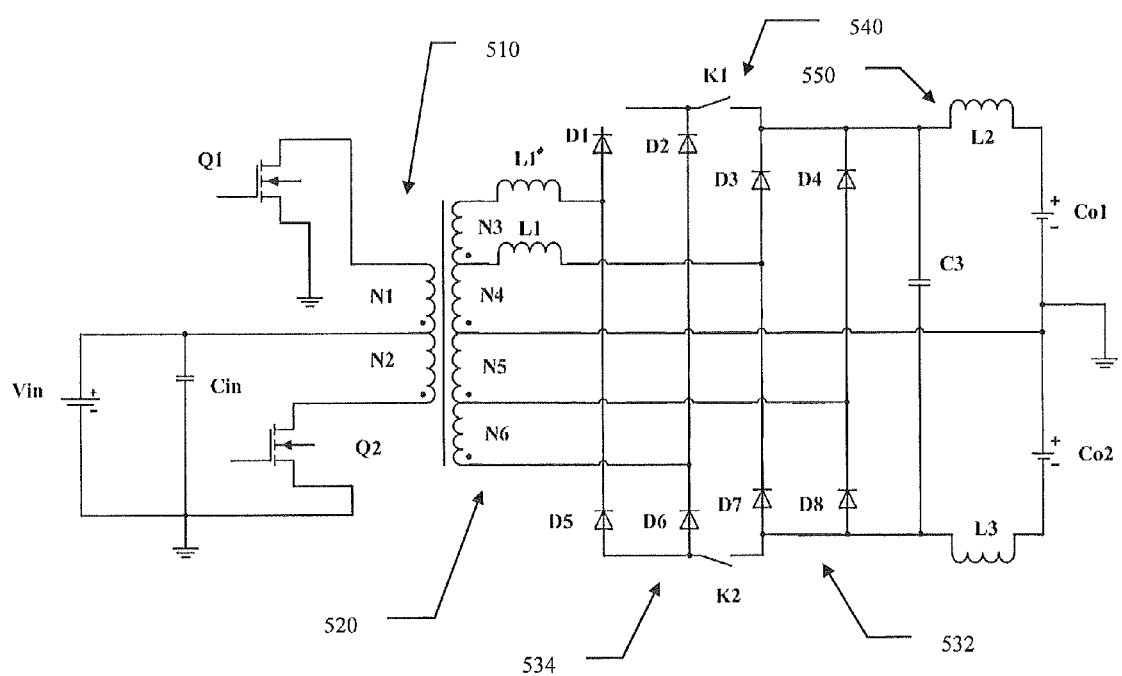
FIG. 5 shows a structural diagram for illustrating a quasi-resonant push-pull converter in accordance with embodiments of the invention.

FIG. 5 shows a structural drawing for illustrating a quasi-resonant push-pull converter in accordance with embodiments of the invention. The primary side of a push-pull converter comprises a DC input power supply, MOSFET switching tubes Q1 and Q2, an input capacitor Cin and the primary windings of turns N1 and N2 whose connecting relations are: the positive electrode of the DC input power supply connects with the source electrode of the MOSFET switching tube Q1 via the primary windings of turns N1 and the drain electrode of the MOSFET switching tube Q1 is grounded; the positive electrode of the DC input power supply connects with the source electrode of the MOSFET switching tube Q2 via the primary windings of turns N2 and the drain electrode of the MOSFET switching tube Q2 is grounded; and the input capacitor Cin is paralleled to the DC input power supply, with one end connected to the dotted terminal of the primary windings of turns N1 and the other end connected to ground wires.

The secondary side of a push-pull converter comprises: a secondary windings with turns N3, N4, N5 and N6, a first full-bridge rectifier, a second full-bridge rectifier, a first switch and a second switch, a resonant capacitor C3, inductors L2 and L3, output capacitors Co1 and Co2, wherein the first full-bridge rectifier comprises diodes D1, D2, D5 and D6, and the second full-bridge rectifier comprises D3, D4, D7 and D8. The first full-bridge rectifier connects with the other end of the secondary windings with turns N3 and the dotted terminal of the secondary windings with turns N6; the second full-bridge rectifier connects with the dotted terminal of the secondary windings with turns N3 and the other end of the secondary windings with turns N6.

The specific connecting relations are: the other end of the secondary windings with turns N3 connects with one end of the transformer equivalent leakage inductor L1; the other end of the transformer equivalent leakage inductor L1 connects with the positive electrode of the diode D1 and the negative electrode of the diode D5; the dotted terminal of the secondary windings with turns N3 connects with one end of the transformer equivalent leakage inductor L1; the other end of the transformer equivalent leakage inductor L1 connects with the positive electrode of the diode D3, the negative electrode of the diode D7 and the other end of the secondary windings with turns N4. The dotted terminal of the secondary windings with turns N4 and the other end of the secondary windings with turns N5 are grounded; the dotted terminal of the secondary windings with turns N5 connects with the positive electrode of the diode D4, the negative electrode of the diode D8 and the other end of the secondary windings with turns N6; the dotted terminal of the secondary windings with turns N6 connects with the positive electrode of the diode D2 and the negative electrode of the diode D6.

The negative electrode of the diode D1 connects with the negative electrode of the diode D2 and one end of the switch K1. Alternatively, other circuit that can achieve the function of a switch can substitute for the switch K1. The other end of the switch K1 connects with the negative electrodes of the diodes D3 and D4, one end of the resonant capacitor C3 and one end of the inductor L2; the other end of the inductor L2 connects with the positive electrode of the output capacitor Co1; the negative electrode of the output capacitor Co1 is grounded.

The positive electrode of the diode D5 connects with the positive electrode of the diode D6 and one end of the switch K2. Alternatively, other circuit that can achieve the function of a switch can substitute for the switch K2. The other end of the switch K2 connects with the positive electrodes of the diodes D7 and D8, the other end of the resonant capacitor C3 and one end of the inductor L3; the other end of the inductor L3 connects with the negative electrode of the output capacitor Co2; the positive electrode of the output capacitor Co2 is grounded.

Figure 6:
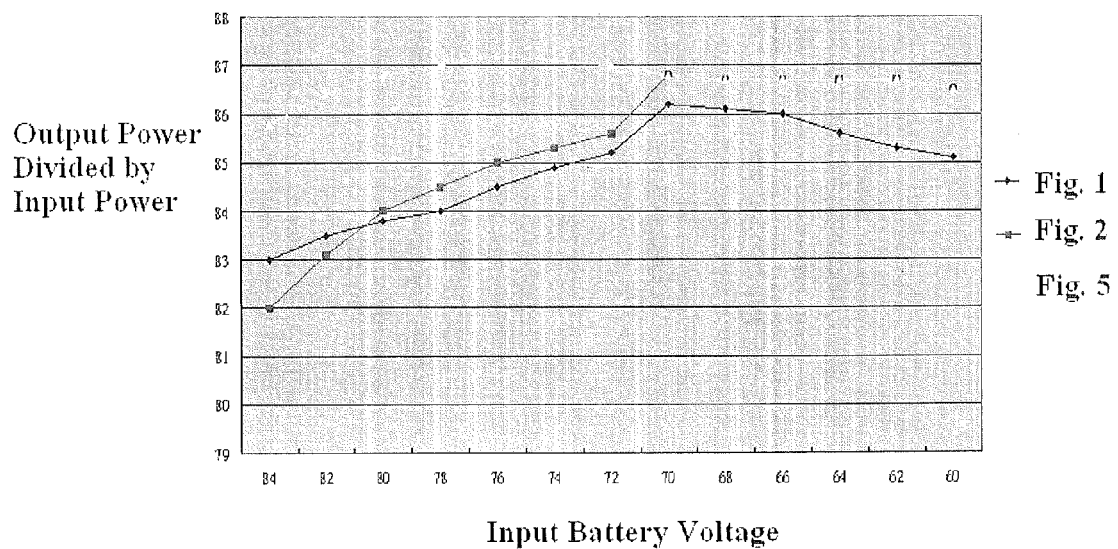
FIG. 6 shows a comparison graph for illustrating power transient efficiency of FIG. 1, FIG. 2 and FIG. 5 under different input voltages.

By the control of simultaneous closure and open of the switch circuits K1 and K2, the integrated resonant push-pull converter as shown by FIG. 6 can maintain the resonant effect in a good state. When both K1 and K2 are opened, the secondary windings working at the secondary side are N4 and N5. In the preferential embodiments of the invention, turns N3 and N6 of the secondary side of a set of transformers are added and the resonant circuit is designed at the state of outputting low voltages; when both K1 and K2 are closed, the turns working at the secondary side increase to (N3+N4) and (N5+N6). Therefore, by the improved embodiments of the invention, the different values of output voltage divided by input voltage can be controlled in the resonant push-pull converter to meet various requirements so that resonant effect at the time of high voltages input is the same as that at the time of low voltages input.

When the battery is at the state of high voltages input, for example, when the DC input voltage is higher than a predetermined value zero, the first switch K1 and the second switch K2 are both opened; the secondary windings working at the secondary side are N4 and N5; the duty of the switches K1 and K2 becomes larger; the resonant capacitor C3 resonates with the leakage inductor L1; the switches Q1 and Q2 enter the resonant mode. When voltage of the battery goes down to a predetermined value as a result of discharging, for example, when the DC input voltage is lower than the predetermined value zero, the first switch K1 and the second switch K2 are both closed; the turns working at the secondary side increase to (N3+N4) and (N5+N6); the turns ratio of the primary windings and the secondary windings is changed so as to maintain value of the output voltage; the resonant capacitor C3 resonates with the leakage inductor L1'; the switches Q1 and Q2 operate in the resonant mode. As a result, resonant effect of the switches Q1 and Q2 is maintained in a good state in the whole battery discharging process so as to improve the overall discharging efficiency.

FIG. 6 shows a comparison graph for illustrating power transient efficiency of FIG. 1, FIG. 2 and FIG. 5 under different input voltages. The X-axis in FIG. 6 represents the input battery voltage progressively increasing from the left to the right, and the lowest voltage is 60 volts and the highest one is 84 volts, wherein the voltage progressively increases by 2 volts with each coordinate. The Y-axis represents the value of output power divided by input power and the value is expressed in percentage, and the lowest value is 79% and the highest one is 88%, wherein each coordinates progressively increases by 1%. The triangle point represents the power transient efficiency value of the circuit as shown by FIG. 5 under different voltages, and the rhombohedral point represents the power transient efficiency value of the circuit as shown by FIG. 1 under different voltages.

As shown by FIG. 6, when the input battery voltage is between 84 volts and 70 volts, the values of output power divided by input power of the circuits as shown by FIG. 1 and FIG. 2 go up as the input battery voltage goes down; when the input battery voltage is between 70 volts and 60 volts, the value of output power divided by input power of the circuit as shown by FIG. 1 goes down as the input battery voltage goes down; when the input battery voltage is 68 volts, 66 volts, 64 volts and 62 volts, the values of output power divided by input power of the circuit as shown by FIG. 2 are identical, all the values being smaller than the value of output power divided by input power when the input battery voltage is 70 volts and greater than the value of output power divided by input power when the input battery voltage is 60 volts. When the input battery voltage is between 84 volts and 76 volts, the value of output power divided by input power of the circuit as shown by FIG. 5 goes up as the input battery voltage goes down; when the input battery voltage is between 76 volts and 70 volts, the value of output power divided by input power of the circuit as shown by FIG. 5 goes down as the input battery voltage goes down; when the input battery voltage is between 70 volts and 60 volts, the value of output power divided by input power of the circuit as shown by FIG. 5 is the same as that as shown by FIG. 2.

The values of output power divided by input power of the circuits as shown by FIG. 1 and FIG. 2 maximize respectively when the input battery voltage is 70 volts, and the value of output power divided by input power of the circuit as shown by FIG. 5 maximizes when the input battery voltage is 76 volts. The values of output power divided by input power of the three minimize respectively when the input battery voltage is 84 volts. When the input battery voltage is 84 volts and 82 volts, the value of output power divided by input power of the circuit as shown by FIG. 1 is greater than that as shown by FIG. 2, whereas at all the other points, the values of output power divided by input power of the circuit as shown by FIG. 1 are smaller than those as shown by FIG. 2.

When the input battery voltage is between 70 volts and 60 volts, the value of output power divided by input power of the circuit as shown by FIG. 5 is the same as that as shown by FIG. 2. When the input battery voltage is between 84 volts and 70 volts, the value of output power divided by input power of the circuit as shown by FIG. 5 is greater than those as shown by FIG. 1 and FIG. 2.

Therefore, in most cases, the efficiency of the quasi-resonant push-pull converter as shown by FIG. 5 is higher than that of the push-pull converter as shown by FIG. 1 and FIG. 2 and the integrated quasi-resonant push-pull converter achieves a higher efficiency.

It can be seen from FIG. 6 that efficiency of the whole push-pull resonant circuit does not become low due to high or low voltages input to the battery and the efficiency is maintained at a comparatively high level, as a result, the overall efficiency of the whole battery mode is improved.

What is claimed is:

1. A quasi-resonant push-pull converter comprising:
   a transformer having a primary winding and a secondary winding;
   an input circuit configured to apply a DC power source to the primary winding of the transformer;
   a resonant circuit;
   a rectifier circuit having an input coupled to the secondary winding and an output coupled to the resonant circuit; and
   a switching circuit configured to modify a coupling of the secondary winding to the resonant circuit via the rectifier circuit responsive to a voltage of the DC power source.

2. The converter of claim 1, wherein the switching circuit is configured to change a turns ratio applied to the rectifier circuit.

3. The converter of claim 2, wherein the switching circuit is configured to change the turns ratio to control an efficiency of the converter.

4. The converter of claim 1:
   wherein the rectifier circuit comprises:
      a first rectifier circuit having an input coupled to first and second terminals of the secondary winding and an output coupled to an input of the filter circuit; and
      a second rectifier circuit having an input coupled to third and fourth terminals of the secondary winding; and
      wherein the switching circuit is configured to couple and decouple an output of second rectifier circuit to and from the output of the first rectifier circuit.

5. The converter of claim 4, wherein the switching circuit comprises first and second switches configured to couple and decouple the output of second rectifier circuit to and from the output of the first rectifier circuit.

6. The converter of claim 4, wherein the first and second rectifier circuits are full-bridge rectifier circuits.

7. A method of operating a quasi-resonant push-pull converter comprising an input circuit configured to apply a DC power source to a primary winding of a transformer, a rectifier circuit coupled to a secondary winding of the transformer and an output filter coupled to an output of the rectifier circuit, the method comprising:

selectively modifying a coupling of the secondary winding to the output filter via the rectifier circuit responsive to a voltage of the DC power source to control an efficiency of the converter.

8. The method of claim 7, wherein selectively modifying a coupling of the secondary winding to the output filter via the rectifier circuit responsive to a voltage of the DC power source to control an efficiency of the converter comprises changing a turns ratio applied to rectifier circuit.

9. The method of claim 7, wherein the rectifier circuit comprises a first rectifier having an input coupled to first and second terminals of the secondary winding and an output coupled to an input of the filter circuit and a second rectifier circuit having an input coupled to third and fourth terminals of the secondary winding and wherein selectively modifying a coupling of the secondary winding to the output filter via the rectifier circuit responsive to a voltage of the DC power source to control an efficiency of the converter comprises coupling and decoupling an output of the second rectifier circuit to and from the output of the first rectifier circuit responsive to the voltage of the DC power source.

10. The method of claim 9, wherein the first rectifier circuit and the second rectifier circuit are full-bridge rectifier circuits.

11. The method of claim 7, wherein selectively modifying a coupling of the rectifier circuit responsive to a voltage of the DC power source to control an efficiency of the converter comprises selectively modifying a coupling of the rectifier circuit responsive to a voltage of the DC power source to maintain resonant mode operation of a switching device of the input circuit as the voltage of the DC source changes.

* * * * *